Feb. 6, 1940. J. DESSÈVRE 2,189,488
PROCESS OF SEPARATION, BY FLOATING, OF AMMONIUM CHLORIDE
FROM ITS MIXTURE WITH ALKALINE SALTS
Filed Oct. 11, 1937 2 Sheets-Sheet 1

INVENTOR
JEAN DESSÈVRE
BY
Young, Emery & Thompson
ATTYS.

Patented Feb. 6, 1940

2,189,488

UNITED STATES PATENT OFFICE 2,189,488

PROCESS OF SEPARATION, BY FLOATING, OF AMMONIUM CHLORIDE FROM ITS MIXTURE WITH ALKALINE SALTS

Jean Dessèvre, Grand-Couronne, France

Application October 11, 1937, Serial No. 168,518
In France October 28, 1936

10 Claims. (Cl. 23—100)

It is a known fact that by a flotation operation, ammonium chloride can be separated from its mixtures with alkaline salts such as nitrates, sulphates, carbonates, etc.

It is further known that for the said flotation operation, use is currently made, as a liquid for suspension, of the saturated mother-liquor in which there has been preliminarily effected the preparation of the mixture of ammonium chloride and of the alkaline salts by double decomposition between an alkaline chloride and one or more salts of ammonium. The flotation of the mixture may be effected by the well-known processes "with oil" or "with foam", and the saturated mother-liquor forming the liquid of suspension is brought into the cycle in order to serve as a medium for the next operation of double decomposition followed by another flotation operation, and so on.

The said mother-liquors are saturated as concerns all of the salts used for the double decomposition or resulting from the same, but they will still dissolve other salts which are obtained either from raw material which is constantly supplied, or from the water used to make up for the losses, or again, from corrosions which may sometimes occur in the apparatus and piping utilized during the operations.

However, the surprising observation has been made that the yield from the flotation operation, i. e., the purity of the salts obtained after the separation, will depend to a great extent upon the nature of the foreign salts contained in the mother-liquor.

For instance, for the preparation of ammonium chloride and potassium nitrate, if use is made, as raw material, of potassium chloride containing sodium chloride as an impurity, it is evident that at each cycle, the mother-liquor will become gradually charged with sodium nitrate. It has been observed that a considerable proportion of sodium nitrate in the mother-liquor, for instance 500 kgs. of $NaNO_3$ per 1,000 kgs. of $H_2O$, will have practically no effect upon the yield of the flotation operation.

On the contrary, the presence, in the mother-liquor of a very small quantity of certain other soluble salts, which are not ammoniacal and not alkaline, will reduce the yield of the flotation operation to a considerable degree. For instance, a yield which is normally 98% will be reduced to about 80%, when these salts are contained in the mother-liquor only in the proportion of 3 kgs. per 1,000 kgs. of $H_2O$.

It has been further observed that there is no fixed ratio between the proportion of the harmful salts in the mother-liquor and the consequent reduction of the yield. If as above stated, an amount of 3 kgs. will cause a reduction of 16%, on the contrary, half this amount will only cause a reduction of 2 or 3%.

This last-mentioned property, which is in fact unexpected, is quite important, as it provides for the floating operation in most satisfactory conditions, with the use of mother-liquor still containing a small amount of salts which are not ammoniacal and not alkaline.

The present invention takes advantage of the two observations above mentioned, in order to make considerable improvements in the known flotation process with ammonium chloride, by which the preparation, in the pure state, of ammonium chloride and also of various alkaline salts, may be effected in a closed cycle, and with the indefinite use of the same mother-liquor.

In order to more clearly set forth the invention, flow sheets of two operations are shown in the attached drawings, in which.

Figure 1:
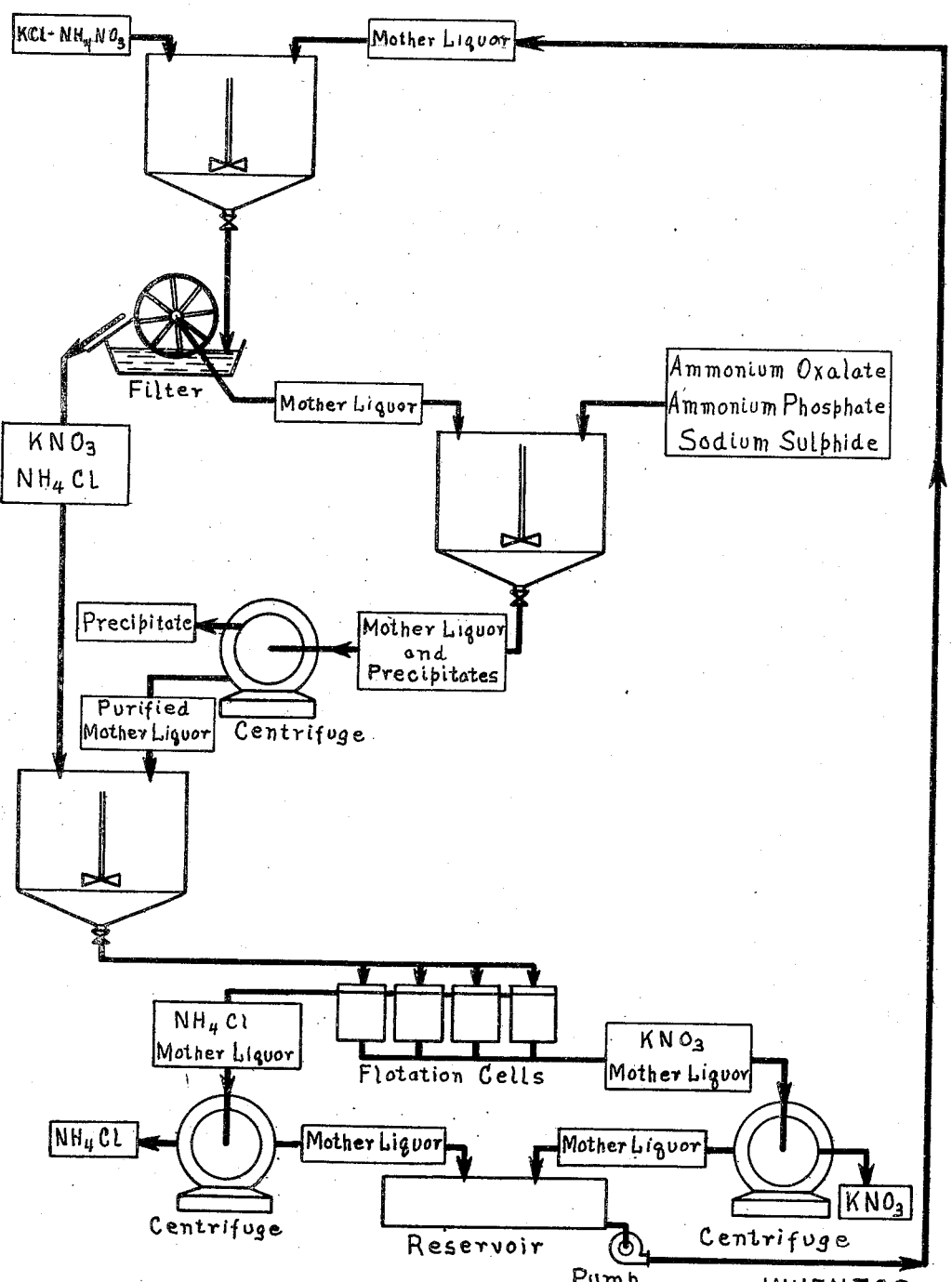
Figure 1 is a flow diagram illustrating one form of the invention.
Figure 2:
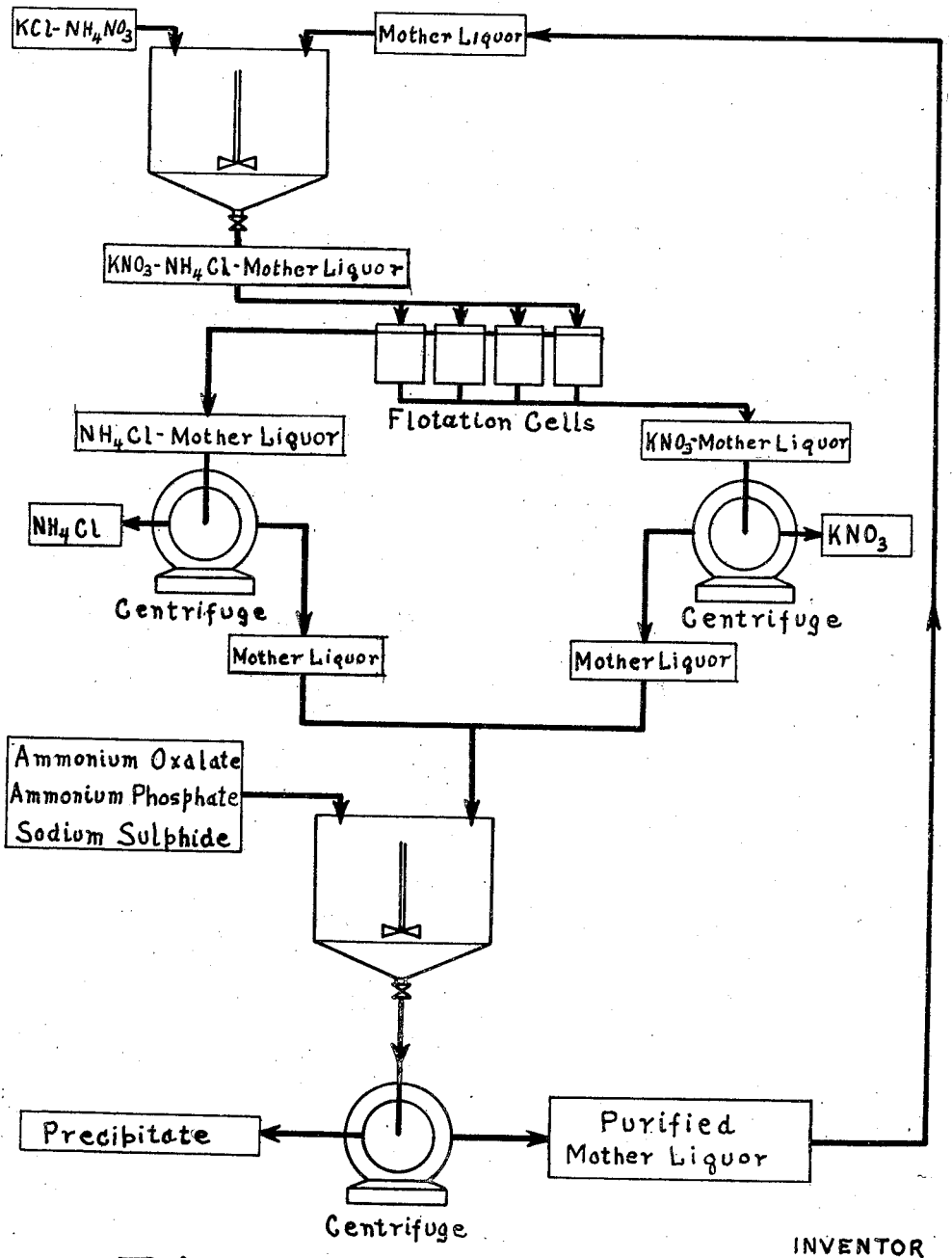
Fig. 2 is another flow diagram illustrating another form of the invention.

In conformity with the invention, there is effected, at any time in the cycle, the total or partial purification of the mother-liquor, by the total or partial elimination of one or more of the non-ammoniacal or non-alkaline soluble salts which they may contain.

It is preferable to effect this elimination from the mother-liquor before it is used as a medium for the double decomposition, for in fact, at this stage of the process, the mother-liquor is already freed from insoluble substances and undissolved crystals. Thus the treatment according to the invention will not complicate the normal operation in cycles.

The invention further permits of effecting the said purification also after the double decomposition and before the flotation operation. It might be considered that this modification is more satisfactory than the preceding one as in this manner the non-ammoniacal and non-alkaline salts brought in by the raw materials which have been subjected to the said double decomposition can be eliminated, but it is remarked that this method of proceeding leads to considerable complications. In fact, after the double decomposition and before the flotation operation, the mother-liquor contains in suspension, the crystals of the mixture of ammonium chloride which are to be removed, and thus if at this time it should be desired to carry out the purification according to the invention, it will be necessary to first remove the mixture of salts in crystals from the mother-liquor, and after the purification, to again place the mixture of salts in the mother-liquor, in order to provide for the flotation operation.

These complications are not compensated by any advantage, as experience shows that when the flotation takes place in such conditions, it is often less satisfactory than the flotation effected according to the first method comprised in the invention.

It should be further remarked that in the first method of operating (purification before the double decomposition), the quantity of non-ammoniacal and non-alkaline soluble salts contained in the mother-liquor subjected to the flotation operation, corresponds practically to the quantity of these salts added by the supply of raw material used for the double decomposition; but this quantity is very small, and as above stated, it will not practically reduce the yield of the flotation operation.

The non-ammoniacal and non-alkaline soluble salts whose total or partial removal is recommended by the invention, are in most cases salts of the alkaline earth metals (such as salts of magnesium or calcium).

To provide for the removal of such salts according to the invention, the operation is carried out by precipitation, the salts being thus transformed into insoluble salts, in the conditions of the operation. Hence in order to remove the magnesium salts it is possible to add to the mother-liquor a suitable quantity of di-ammonium phosphate, thus forming a phosphate of ammonium and magnesium, which is insoluble. An ordinary filtration provides for the removal of the resulting precipitate.

For the elimination of the calcium salts, it is preferable to use oxalic acid or an alkaline carbonate, thus forming an insoluble oxalate or carbonate of calcium, which is removed by filtration.

Obviously, when it is desired to remove at the same time the soluble salts of magnesium and of calcium, the two aforesaid operations are performed at the same time. The two precipitations do not interfere with each other.

It sometimes happens, for various reasons, that the mother-liquor contains a greater or less amount of soluble salts of the heavy metals such as nickel or copper. This may be due to an accidental corrosion of the apparatus or the piping, in which the mother-liquors circulate.

These salts are prejudicial, as above stated, and for their total or partial removal, according to the invention, an alkaline sulphide is added to the mother-liquor. This will form one or more insoluble metallic sulphides, which are precipitated and can be removed by filtration.

In this case as before, the said substances can be removed concurrently with the salts of the alkaline earth metals.

The proportion of the reagents (such as di-ammonium phosphates, oxalic acid, alkaline carbonate or sulphide) to be added to the mother-liquor may be accurately determined after making a practical test with a small quantity of mother-liquor which is preliminarily taken out, but in practice, advantage may be taken of the fact that a total elimination is not indispensable, in order to use only approximate proportional values, and it is simply necessary to take care that the amount of the reagent which is added shall be somewhat less, and not more, than the amount which is absolutely necessary.

The following numerical examples relate to the method of operating in conformity with the invention and the advantages resulting from the same, both for the process of oil flotation and for the process of foam flotation.

EXAMPLE 1.—(Oil flotation)

For a mother-liquor saturated at 25° C. with sodium nitrate and ammonium chloride and resulting from a previous operation, the following composition is given by analysis:

| | Kilograms |
|---|---|
| Water | 1,000 |
| Ammonium chloride | 300 |
| Sodium nitrate | 800 |
| Ammonium nitrate | 1,200 |
| Free ammonia, $NH_3$ | 6 | with a proportion of soluble calcium salts equivalent to 3 kgs. of lime, CaO.

In conformity with the invention, there are added to this quantity of mother-liquor, 6.5 kgs. of crystallized oxalic acid.

This will form the insoluble oxalate of calcium, which may be removed by filtration. The amount of calcium in the mother-liquor thus treated is now the equivalent of 0.12 kg. of lime, CaO.

With the quantity of mother-liquor thus purified, the process comprises, in the known manner, a double decomposition between equal numbers of molecules of ammonium nitrate and sodium chloride. There is formed a crystalline mixture of ammonium chloride and sodium nitrate.

A flotation operation is then carried out in an oil-floating plant, with the use of 300 litres of gas-oil per 1,000 kgs. of the mixture of salts.

After this operation, ammonium chloride containing 98% of $NH_4Cl$, and sodium nitrate containing 97% of $NaNO_3$ are separately collected.

If the same operations had been performed without removing the soluble calcium salts in the first place, ammonium chloride containing 71% of $NH_4Cl$, and sodium nitrate containing 84% of $NaNO_3$, would have been obtained.

EXAMPLE 2.—(Oil flotation)

A certain quantity of mother-liquor which is saturated at 25° C. with potassium nitrate and ammonium chloride, and is obtained from a preceding operation, showed the following composition by analysis:

| | Kilograms |
|---|---|
| Water | 1,000 |
| Ammonium chloride | 324 |
| Potassium nitrate | 610 |
| Sodium nitrate | 545 |
| Ammonium nitrate | 800 |
| Free ammonia, $NH_3$ | 5 | with a proportion of soluble salts of calcium, magnesium and nickel, which is respectively equivalent to 0.8 kg. of magnesia MgO, 0.1 kg. of lime CaO, and 1.2 kgs. of nickel oxide NiO.

In conformity with the invention, there are added to this amount of mother-liquor, 2.5 kgs. of di-ammonium phosphate; 1.8 kgs. of sodium carbonate, and 1.2 kgs. of sodium sulphide. There are respectively formed a phosphate of ammonium and magnesium, calcium carbonate and nickel sulphide.

These salts are insoluble, and can be eliminated simply by filtration.

The proportion of soluble salts of magnesium, calcium and nickel in the quantity of mother-liquor which has been thus treated, is now equivalent respectively to 0.05 kg. of magnesia MgO, 0.05 kg. of lime CaO, and 0.04 kg. of nickel oxide NiO.

The mother-liquor thus treated is then subjected in the known manner to a double decomposition between the equal number of molecules of ammonium nitrate and potassium chloride.

There is formed a crystalline mixture of ammonium chloride and potassium nitrate.

The next step is a flotation operation in an ordinary oil-flotation plant, with the use of 300 litres of gas-oil per 1,000 kgs. of mixture of salts.

After this operation, ammonium chloride containing 78% of $NH_4Cl$, and potassium nitrate containing 96% of $KNO_3$ are separately collected.

If the same operations of double decomposition and flotation had been performed without first removing the soluble salts of magnesium, calcium and nickel, ammonium chloride containing 70% of $NH_4Cl$ and potassium nitrate containing 80% of $KNO_3$, would have been obtained.

It should be noted that the aforesaid quantity of mother-liquor contains 545 kgs. of sodium nitrate per 1,000 kgs. of water, but this great proportion of a foreign salt will make no change in the operations. On the contrary, the soluble salts of magnesium, calcium and nickel, whose equivalent in oxides is only 3 kgs., will reduce the purity of the potassium nitrate from 96% to 80% of $KNO_3$, and thus they have a most prejudicial action.

Example 3.—(Foam-flotation)

For a mother-liquor saturated at 25° C. with sodium nitrate and ammonium chloride, which is obtained from a preceding operation, the following composition is shown by analysis.

|  | Kilograms |
|---|---|
| Water | 1,000 |
| Ammonium chloride | 325 |
| Potassium nitrate | 400 |
| Sodium sulphate | 45 |
| Sodium nitrate | 910 |
| Ammonium nitrate | 350 |
| Free ammonia $NH_3$ | 5.5 | with a proportion of soluble salts of calcium and nickel which is respectively equivalent to 1.3 kgs. of lime CaO and 0.7 kg. of nickel oxide NiO.

In conformity with the invention, there are added to this amount of mother-liquor, 2.3 kgs. of sodium carbonate and 0.6 kg. of sodium sulphide. There are formed calcium carbonate and nickel sulphide, which are insoluble. These salts precipitate and can be removed by filtration.

The amount of mother-liquor thus treated has now only a proportion of soluble salts of calcium and of nickel, equivalent to 0.08 kg. of lime CaO and 0.1 kg. of nickel oxide NiO.

The said mother-liquor is then subjected in the known manner to a double decomposition between the equal number of molecules of ammonium nitrate and sodium chloride, and there is formed a crystalline mixture of ammonium chloride and sodium nitrate.

This is followed by a flotation operation in a set of six foam-flotation vats of a known type. The floating reagent employed is stearic acid in solution in a hydrocarbon (2.5 kgs. of reagent per 1,000 kgs. of salt mixture). Ammonium chloride having 95% of $NH_4Cl$, and sodium nitrate having 98% of $NaNO_3$, are then separately collected.

If the same operations of double decomposition and floating had been performed without first removing the soluble salts of calcium and nickel, the result would have been ammonium chloride containing 64% of $NH_4Cl$ and sodium nitrate containing 80% of $NaNO_3$.

It should be noted in this case, as before, that although the mother-liquor contains 400 kgs. of potassium nitrate and 45 kgs. of sodium sulphate per 1,000 kgs. of water, the output of the flotation operation is not diminished.

Example 4.—(Foam-flotation)

In a mother-liquor which is saturated at 25° C. with ammonium nitrate and potassium chloride, and obtained from a preceding operation, analysis showed a proportion of soluble salts of magnesium and calcium equivalent to 2 kgs. of magnesia MgO and 2 kgs. of lime CaO per 1,000 litres of mother-liquor.

In conformity with the invention, there are added to this mother-liquor 6 kgs. of di-ammonium phosphate and 4.3 kgs. of oxalic acid per 1,000 litres of mother-liquor.

A phosphate of ammonium and magnesium, and calcium oxalate, both insoluble, are formed, and can be removed by filtration.

The 1,000 litres of mother-liquor in use contain only a proportion of magnesium and calcium equivalent to 0.18 kg. of magnesia MgO and 0.1 kg. of lime CaO.

In the mother-liquor thus purified, there is effected in the known manner a double decomposition between equal numbers of molecules of ammonium nitrate and potassium chloride, thus producing a crystalline mixture of ammonium chloride and potassium nitrate.

The next step is a flotation operation in a set of six foam-floating vats of the known type.

The reagent consists of naphthenic acid (1 kg. of reagent per 1,000 kgs. of salt mixture), and then ammonium chloride having 92% of $NH_4Cl$, and potassium nitrate having 97% of $KNO_3$ are separately collected.

If the same operations of double decomposition and flotation had been performed without first eliminating the soluble salts of magnesium and calcium, the result would have been ammonium chloride having 60% of $NH_4Cl$ and potassium nitrate having 86% of $KNO_3$.

I claim:

1. A process of separating ammonium chloride from its mixture with alkali metal nitrates, consisting in placing the mixture in suspension in a saturated aqueous medium, separating the ammonium chloride from the rest of the mixture by a flotation operation, removing the crystallized alkali metal nitrates from the mother-liquor, extracting from the mother-liquor the positive ions of dissolved salts of the alkaline earth metals and the heavy metals, and utilizing the purified mother-liquor as the saturated aqueous medium for a new operation of separating ammonium chloride from its mixtures with alkali metal nitrates by flotation.

2. A process of separating ammonium chloride from its mixture with alkali metal nitrates, consisting in placing the mixture in suspension in a saturated aqueous medium, separating the ammonium chloride from the rest of the mixture by a flotation operation, removing the crystallized alkali metal nitrates from the mother-liquor, adding to the mother-liquor precipitating agents for the positive ions of salts of alkaline earth metals and of heavy metals, extracting the precipitate formed, and utilizing the purified mother-liquor as a suspension medium for a new operation of separating ammonium chloride from its mixtures with alkali metal nitrates by flotation.

3. In a cyclic process of preparation by double decomposition and separation by flotation of ammonium chloride and nitrates of alkali metals in suspension in a saturated aqueous medium with reutilization of the final saturated mother-liquor as the saturated aqueous medium for a new cycle of double decomposition and separation by flotation, the step comprising freeing the saturated mother-liquor of positive ions of salts of alkaline earth metals and of heavy metals while free from suspended salts.

4. A cyclic process of producing ammonium chloride and nitrates of alkali metals, consisting in effecting a double decomposition of alkali metal chlorides and ammonium nitrate in suspension in a saturated aqueous medium, removing the mixture of salts formed, extracting from the remaining mother-liquor the positive ions of dissolved salts of alkaline earth metals of heavy metals, returning the mixture of salts in suspension to the motor-liquor so purified, separating the ammonium chloride formed from the rest of the mixture by a flotation operation, separating the mother-liquor from the crystallized alkali metal nitrates, and utilizing the mother-liquor as a saturated aqueous medium for a new operation of double decomposition of alkali metal chlorides and ammonium nitrate.

5. A cyclic process of producing ammonium chloride and alkali metal nitrates, consisting in effecting a double decomposition of alkali metal chlorides and ammonium nitrate in suspension in a saturated aqueous medium, removing the mixture of salts formed, adding to the remaining mother-liquor precipitating agents for the positive ions of dissolved salts of alkaline earth metals and of heavy metals, extracting the precipitate formed, returning the mixture of salts in suspension to the mother-liquor thus purified, separating the ammonium chloride from the rest of the mixture by a flotation operation, separating from the mother-liquor the crystallized alkali metal nitrates, and utilizing the mother-liquor as a saturated aqueous medium for a new operation of double decomposition of alkali metal chlorides and ammonium nitrate.

6. A cyclic process of producing ammonium chloride and alkali metal nitrates, consisting in effecting a double decomposition of alkali metal chlorides and ammonium nitrate in suspension in a saturated aqueous medium, separating the ammonium chloride formed from the rest of the mixture by a flotation operation, separating from the mother-liquor the crystallized alkali metal nitrates, extracting from the remaining mother-liquor the positive ions of dissolved salts of alkaline earth metals and of heavy metals, and utilizing the mother-liquor as a saturated aqueous medium for the double decomposition of a new batch of alkali metal chlorides and ammonium nitrate.

7. A cyclic process of preparing and separating ammonium chloride and alkali metal nitrates, consisting in placing in suspension in a saturated aqueous medium ammonium nitrate and alkali metal chlorides, effecting a double decomposition reaction, separating the ammonium chloride formed from the rest of the mixture by a flotation operation, extracting from the remaining mother-liquor the crystallized alkali metal nitrates, adding to the mother-liquor precipitating agents for the positive ions of salts of alkaline earth metals and heavy metals, extracting the precipitate formed, and utilizing the final mother-liquor as a saturated aqueous medium for the double decomposition of a new batch of ammonium nitrate and alkali metal chlorides.

8. A cyclic process of preparing and separating ammonium chloride and alkali metal nitrates, consisting in placing in suspension in a saturated aqueous medium ammonium nitrate and alkali metal chlorides containing as impurities soluble salts of magnesium and calcium, effecting a double decomposition reaction, separating the ammonium chloride formed from the rest of the mixture by a flotation operation, extracting from the remaining mother-liquor the crystallized alkali metal nitrates, adding to the mother-liquor a mixture of diammonium phosphate and sodium carbonate, separating the precipitate formed by the double phosphate of ammonium and of magnesium and by calcium carbonate, and utilizing the remaining mother-liquor as a saturated aqueous medium for the double decomposition of a new batch of ammonium nitrate and alkali metal chlorides.

9. A cyclic process of preparing and separating ammonium chloride and alkali metal nitrates, consisting in placing in suspension in a saturated aqueous medium ammonium nitrate and alkali metal chlorides containing as impurities soluble salts of magnesium, calcium and heavy metals, effecting a double decomposition reaction, separating the ammonium chloride formed from the rest of the mixture by a flotation operation, extracting from the remaining mother-liquor the crystallized alkali metal nitrates, adding to the mother-liquor a mixture of diammonium phosphate, sodium carbonate and sodium sulphide, recovering the precipitate formed by the double phosphate of ammonium and of magnesium, the calcium carbonate and the heavy metal sulphides, and utilizing the remaining mother-liquor as the saturated aqueous medium for the double decomposition of a new batch of ammonium nitrate and alkali metal chlorides.

10. A cyclic process of preparing and separating ammonium chloride and alkali metal nitrates, consisting in placing in suspension in a saturated aqueous medium ammonium nitrate and alkali metal chlorides, said suspension containing as impurities soluble salts of heavy metals, effecting a double decomposition reaction, separating the ammonium chloride formed from the rest of the mixture by a flotation operation, extracting from the remaining mother-liquor the crystallized alkali metal nitrates, adding to the mother-liquor alkali metal sulphides, recovering the precipitate formed by the sulphides of heavy metals, and utilizing the mother-liquor as a saturated aqueous medium for the double decomposition of a new batch of ammonium nitrate and alkali metal chlorides.

JEAN DESSÈVRE.